US008442387B2

(12) United States Patent
Goodwin et al.

(10) Patent No.: US 8,442,387 B2
(45) Date of Patent: May 14, 2013

(54) METHOD AND SYSTEM FOR DISPLAYING A SERIES OF RECORDABLE EVENTS

(75) Inventors: Mark D. Goodwin, Mountain View, CA (US); Deborah Elizabeth Rodgers, Framingham, MA (US)

(73) Assignee: The DIRECTV Group, Inc., El Segundo, CA (US)

( * ) Notice: Subject to any disclaimer, the term of this patent is extended or adjusted under 35 U.S.C. 154(b) by 730 days.

(21) Appl. No.: 12/686,090

(22) Filed: Jan. 12, 2010

(65) Prior Publication Data

US 2010/0138860 A1 Jun. 3, 2010

Related U.S. Application Data

(63) Continuation of application No. 11/030,692, filed on Jan. 5, 2005, now Pat. No. 7,657,151.

(51) Int. Cl.
*H04N 5/76* (2006.01)

(52) U.S. Cl.
USPC ........... 386/293; 386/292; 386/294; 386/295; 386/296; 386/297

(58) Field of Classification Search ........... 386/291–297
See application file for complete search history.

(56) References Cited

U.S. PATENT DOCUMENTS

| | | | |
|---|---|---|---|
| 5,613,111 A | 3/1997 | Malatesta et al. |
| 6,026,398 A | 2/2000 | Brown et al. |
| 6,167,393 A | 12/2000 | Davis, III et al. |
| 6,452,611 B1 | 9/2002 | Gerba et al. |
| 6,490,722 B1 | 12/2002 | Barton et al. |
| 6,505,348 B1 | 1/2003 | Knowles et al. |
| 6,985,569 B2 | 1/2006 | Baker |
| 7,213,209 B2 | 5/2007 | Lueckhoff et al. |

(Continued)

FOREIGN PATENT DOCUMENTS

| | | |
|---|---|---|
| EP | 0889647 A2 | 1/1999 |
| EP | 1 085 443 A2 | 3/2001 |

(Continued)

OTHER PUBLICATIONS

European Patent Office, Supplementary European Search Report for European Patent Application No. EP 05 85 5303.
International Search Report, International Application No. PCT/US05/46720, completion date of the international search Oct. 18, 2006, mailing date Jun. 4, 2007.
Written Opinion of the International Searching Authority, International Application No. PCT/US05/46720, completion date of the written opinion Oct. 18, 2006, mailing date Jun. 4, 2007.

(Continued)

*Primary Examiner* — Helen Shibru
(74) *Attorney, Agent, or Firm* — McDonnell Boehnen Hulbert & Berghoff LLP (57) ABSTRACT

A method and system for displaying identifiers for one or more series of recordable events is described. A system, such as the system of a digital video recorder, may receive a set of recordable events data, such as a listing of all television shows to be broadcast over a two-week period. The system analyzes the set of recordable events data for determining one or more sets of recordable events, where each set includes recordable events having the same title. The system analyzes each set of recordable events to determine sub-sets of recordable events based on relationships between the recordable events of each sub-set. The system displays an identifier for each sub-set of a given set of recordable events when the given set of recordable events is selected for display. A user may select to record a sub-set of recordable events by selecting the identifier that represents the sub-set.

18 Claims, 8 Drawing Sheets

U.S. PATENT DOCUMENTS

| | | | |
|---|---|---|---|
| 7,290,211 B2 | 10/2007 | Goodwin et al. | |
| 7,373,414 B2 | 5/2008 | Evron et al. | |
| 7,477,833 B2 | 1/2009 | Kato et al. | |
| 7,519,590 B2 | 4/2009 | Chandrasekar et al. | |
| 7,657,151 B2 | 2/2010 | Goodwin et al. | |
| 7,765,479 B2 | 7/2010 | Goodwin et al. | |
| 7,779,445 B2* | 8/2010 | Ellis | 725/93 |
| 2002/0054062 A1 | 5/2002 | Gerba et al. | |
| 2002/0124256 A1 | 9/2002 | Suzuka | |
| 2002/0174430 A1 | 11/2002 | Ellis et al. | |
| 2003/0079227 A1 | 4/2003 | Knowles et al. | |
| 2003/0208756 A1 | 11/2003 | Macrae et al. | |
| 2004/0049787 A1 | 3/2004 | Maissel et al. | |
| 2004/0117831 A1 | 6/2004 | Ellis et al. | |
| 2004/0117837 A1 | 6/2004 | Karaoguz et al. | |
| 2004/0158853 A1 | 8/2004 | Doi et al. | |
| 2004/0170260 A1 | 9/2004 | Baker | |
| 2004/0203639 A1 | 10/2004 | Ozer et al. | |
| 2004/0223738 A1 | 11/2004 | Johnson | |
| 2005/0117461 A1 | 6/2005 | Seo et al. | |
| 2005/0160353 A1* | 7/2005 | Conrad et al. | 715/505 |
| 2005/0165795 A1 | 7/2005 | Myka et al. | |
| 2005/0187943 A1 | 8/2005 | Finke-Anlauff et al. | |
| 2006/0143054 A1 | 6/2006 | Taylor | |
| 2006/0150123 A1 | 7/2006 | Goodwin et al. | |
| 2006/0164930 A1 | 7/2006 | Seo et al. | |
| 2006/0184984 A1 | 8/2006 | Goodwin et al. | |
| 2006/0200449 A1 | 9/2006 | Pauws | |
| 2007/0147782 A1 | 6/2007 | Shibata | |
| 2007/0244880 A1 | 10/2007 | Martin et al. | |
| 2008/0255691 A1 | 10/2008 | Sutardja et al. | |
| 2009/0222392 A1 | 9/2009 | Martin et al. | |

FOREIGN PATENT DOCUMENTS

| | | |
|---|---|---|
| EP | 1107586 82 | 6/2001 |
| EP | 1107586 A2 | 6/2001 |
| EP | 1 378 911 A1 | 7/2004 |
| EP | 1549055 A1 | 6/2005 |
| WO | 2004032491 A1 | 4/2004 |

OTHER PUBLICATIONS

International Search Report and Written Opinion of the International Searching Authority for International Application No. PCT/US06/00225, mailing date Jun. 19, 2007.

Sonic Blue Incorporated, Replay TV 5000, User's Guide, 2002.

TIVO Viewer's Guide, TiVo Inc., Alviso, CA, 2002.

European Patent Office, Communication pursuant to Article 94(3) EPC for European Patent Application No. 05 855 303.3-1241, Dec. 2, 2011.

Supplementary European Search Report, Nov. 22, 2007, Application No. 06717431.8-1225 PCT/US2006000225.

Ohmata, et al, "A Metadata-based Environment Adaptive Review System for Digital Broadcasting," Local Computer Networks, Proceedings LCN 2002, 27th Annual IEEE Conference, Nov. 2002, Piscataway, NJ, USA, IEEE, pp. 325-326.

Richard Lennox, "Development of an RDF/XLM based data model for bibliographic data" School of Mathematical and Computer Sciences (MACS), 2004, XP002459430, Edingburgh, Scotland, retrieved from the Internet at http://66.102.1.104/scholar?hl+en&lr=&q=cache:sAlqKUM-NQJ:www.macs.hw.ac.uk/{ceerdl/Dissertation/dissertation.pdf on Nov. 21, 2007.

European Patent Office, Examination report for European Patent Application No. 05 855 087.-2212, Aug. 29, 2008.

International Searching Authority (ISA/US), International Search Report for International Application No. PCT/US05/46465, May 17, 2007.

International Searching Authority (ISA/US), Written Opinion of the International Searching Authority for International Application No. PCT/US05/46465, May 17, 2007.

European Patent Office, Summons to attend oral proceedings for European Patent Application No. 05 855 087.2-2212/1844400, Jul. 13, 2009.

European Patent Office, Supplementary European Search Report for European Patent Application No. EP 05 85 5087, Jun. 4, 2008.

* cited by examiner

Show Search

Enter Show Title: FR_

Ⓐ Ⓑ Ⓒ Ⓓ Ⓔ Ⓕ Ⓖ
Ⓗ Ⓘ Ⓙ Ⓚ Ⓛ Ⓜ Ⓝ
Ⓞ Ⓟ Ⓠ Ⓡ Ⓢ Ⓣ Ⓤ
Ⓥ Ⓦ Ⓧ Ⓨ Ⓩ (Space)
(← 1 →)  (Delete)
(← Go Back)

Frank Clark Simply P...
Frank Sinatra, A Man...
Fraiser
Fred Rogers: America'.
French in Action
Fresh Prince of Bel-Air.
Friends
From Lawrence Welk:...

Figure 6

Show Search

- Useful Searches →
- Movie Genres
- TV Genres
- Sports
- Just for Kids
- News and Weather
- Lifestyle {
- TV-Primetime Shows
- TV-Season Premieres
- TV-Season Finales
- TV-Shows in HDTV
- Sports-Playoff Games
- Movies-Critics Choice
- Movies-Kids Picks
- Movies-Letterboxed

METHOD AND SYSTEM FOR DISPLAYING A SERIES OF RECORDABLE EVENTS

RELATED APPLICATION

This application is a continuation of prior U.S. patent application Ser. No. 11/030,692, filed on Jan. 5, 2005, and issued as U.S. Pat. No. 7,657,151 on Feb. 2, 2010. U.S. patent application Ser. No. 11/030,692 is hereby incorporated by reference.

FIELD OF THE INVENTION

The present invention relates to a graphical user interface for a recordable event recorder d, more particularly, to a graphical user interface that displays identifiers for a series of recordable events.

BACKGROUND

Many systems and devices include a user interface. A user interface provides means of communication between a user and a system/device. The communication between a user and a system/device may include inputting information to the system/device and/or receiving information from the system/device.

The ability of a user to successfully use a user interface depends in part on the skills and knowledge of the user and on the design of the user interface. A first user interface having a design that is relatively simple to use does not require as much skill and knowledge to use as compared to a second user interface having a more complex design. As the design of the second user interface becomes more complex, the relative amount of user skill and user knowledge required to successfully use the second user interface increases. In some instances, the design of the user interface is so complex that the user becomes frustrated when attempting to use the user interface, and in turn, the user (i) does not use some of functions accessible by the user interface, or (ii) returns the product with the complex user interface to the product manufacturer.

An example of a user interface having relatively simple design is a plain old telephone system (POTS) telephone. Using the user interface of a POTS telephone may be as simple as (i) picking up a handset when the telephone is ringing, (ii) listening to sounds output from a handset speaker, and (iii) talking into a handset microphone. Alternatively, using the user interface of a POTS telephone may involve (i) picking up the handset, (ii) dialing a telephone number by pressing keys of a keypad in a particular sequence, (iii) listening to sounds output from the handset speaker, and (iv) talking into the handset microphone. Using the user interface of a POTS telephone is relatively easy to learn, easy to remember, and rarely results in a user not using the user interface because of the complexity of the user interface.

An example of a user interface that is relatively more complex as compared to a POTS telephone user interface is a user interface for inputting time information for changing the time displayed on a video cassette recorder (VCR). A user interface for inputting time information may require (i) entering a VCR programming mode and then pressing some combination of keys, such as an hours key and a minutes key on a VCR keypad, or (ii) entering a programming mode via a VCR remote control and then pressing a series of keys on the remote control. Inputting time information into some VCRs may be so complex that (i) the user must refer to a user's manual in order to determine how to input the time information, or (ii) the user foregoes inputting time information. In the instance when the user foregoes inputting time information, the VCR may continue display an incorrect time and/or continue to flash a default time such as 12:00. By not inputting the time information, the user may not be able to use certain VCR functions, such as a record function that starts and ends the recording of a television show based on a time as indicated by the VCR clock.

Another user interface that may be considered complex is the user interface of a recordable event recorder, such as a digital video recorder (DVR). In particular, a portion of a recordable event recorder user interface that allows a user to select some or all of the television shows having a given title that are to be broadcast over a given time-period, may be relatively complex to use. FIG. 1 depicts a portion of a media planner that displays recommended television programs and that allows for recording any of the recommended television program by selecting the "R" tab associated with a given television program. Finding all television programs that are displayed on this media player display and that have a given title requires searching each column and row to find all such television programs. If the user overlooks one or more of the television programs displayed on the media player display having the given title, the media player will not schedule to record the overlooked programs.

Thus, it would be desirable to have a recordable event recorder user interface that allows a user to select some or all television shows having a given name that are to be broadcast over a given time-period, that is (i) relatively simple to use, and (ii) prevents human error during a user-search of a large list of data of television shows.

SUMMARY

An architecture that supports a method and system for displaying identifiers for one or more series of recordable events is described herein. Examples of recordable events include television shows and radio shows. A series of recordable events may be defined in any of a variety of manners, such as a series of recordable events defined by a title of each recordable event within the series. Other manners of defining a series are described below. Identifiers for a series provide an indication of a relationship common to all recordable events within the series. When the identifiers for one or more series of recordable events are displayed, such as on a graphical user interface, a user may select a series of recordable events to be recorded by selecting one of the displayed identifiers that represents the series to be recorded.

In one respect, a system for displaying identifiers for one or more series of recordable events includes (i) a communication interface for receiving a set of recordable events data, (ii) a processor that is communicatively coupled to the communication interface and which executes a set of program instructions, (iii) data storage that is communicatively coupled to the processor and which stores the set of recordable events data and the program instructions, and (iv) a user interface for displaying a respective identifier for each of the one or more subsets of recordable events when the given set of recordable events is selected for display. The program instructions of this system include instructions for (i) analyzing the set of recordable events data for determining one or more sets of recordable events, and (ii) analyzing each set of recordable events for determining a respective relationship among one or more subsets of recordable events of each set of recordable events. A set of recordable events are all of the recordable events having the same title and represented by data with the set of recordable events data.

In another respect, a method for displaying identifiers for one or more series of recordable events may be carried out by (i) analyzing a set of recordable events data for determining one or more sets of recordable events, (ii) analyzing each set of recordable events for determining a respective relationship among one or more subsets of recordable events, and (iii) displaying a respective identifier for each of the one or more subsets of recordable events for a given set of recordable events when the given set of recordable events is selected for display.

In yet another respect, a method for displaying identifiers for one or more series of recordable events may be carried out by (i) analyzing a set of recordable events data for determining one or more sets of recordable events, (ii) analyzing each set of recordable events for determining a first relationship among a first subset of each set of recordable events, and a second relationship among a second subset of each set of recordable events, and (iii) displaying a first identifier for a first subset of a first set of recordable events, and a second identifier for a second subset of the first set of recordable events. The first subset defines a first series of recordable events and the second subset defined a second series of recordable events. A graphical user interface may be used to display the first and second identifiers. In this regard, the graphical user interface is a part of a recordable events recorder and allows for selecting a series of recordable events to be recorded by selecting the identifier for the series via the graphical user interface.

These and other aspects, advantages, and alternatives will become more apparent to those of ordinary skill in the art by reading the following detailed description, with reference where appropriate to the accompanying drawings.

BRIEF DESCRIPTION OF THE DRAWINGS

Exemplary embodiments of the present invention are described herein with reference to the drawings, in which:

FIG. 1 is a prior art drawing from U.S. Patent Application Publication US 2004/0203639 that illustrates a portion of a media planner displaying recommended television programs;

DETAILED DESCRIPTION OF AN EXEMPLARY EMBODIMENT

1. Overview

An exemplary embodiment of a method and system for displaying identifiers for one or more series of recordable events is described herein. One or more sets of recordable events may be identified from a set of recordable events data. Data for each of the one or more sets of recordable events may be analyzed for determining a respective relationship for one or more subsets (series) of recordable events within each set of recordable events data. Thereafter, a respective identifier for the one or more series of recordable events may be displayed on a graphical user interface, to in turn, allow a user to select a series of recordable events for recordation of the series in data storage.

A series of recordable events may be defined in any of a variety of manners. For example, a series of recordable events may be defined by recordable events having the same show title, such as the television show title "Friends." As another example, a series of recordable events may be all shows to be broadcast on a given channel at a given time, but that each have a different show title. In this regard, the series may involve a series of shows to be shown on channel 6 from 9:00 pm to 11:00 pm and that pertain to the creation of the Earth, where respective recordable events in the series have show titles such as (i) "Genesis: How it all began", or (ii) "Fish with Legs: Life on Earth." Other examples of how a series of recordable events may be defined are also possible.

Figure 2:
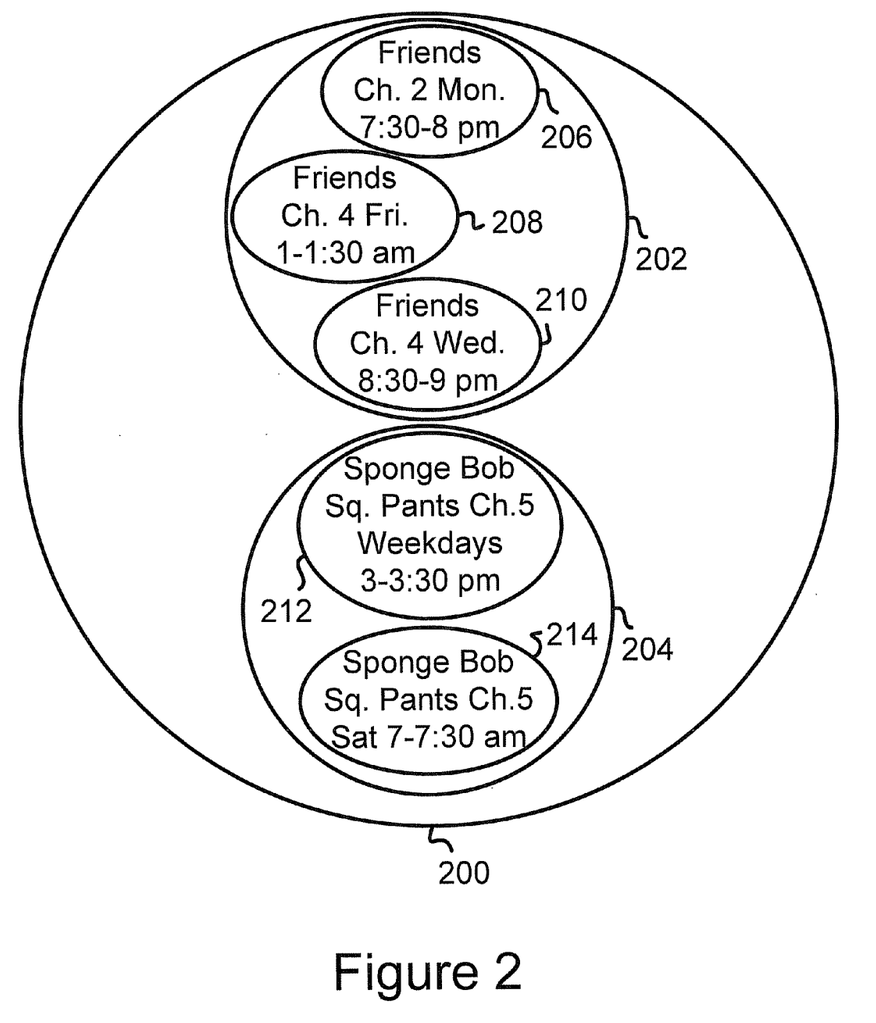
FIG. 2 is a Venn diagram that illustrates a set of recordable events data, sets of recordable events, and subsets of recordable events.

FIG. 2 is a diagram that depicts a set of recordable events data 200. The set of recordable events data 200 includes data pertaining to recordable events to occur over a given period of time. For example, the given period of time may be 14 days. Other examples of the given period of time are also possible.

The set of recordable events data 200 may include data for one or more types of recordable events. As an example, the set of recordable events data 200 may include data for the type of recordable events known as television shows, such as the television show entitled Friends that originally aired on the National Broadcasting Communication (NBC) network. As another example, the set of recordable events data 200 may include data for the type of recordable events known as radio shows, such as the Howard Stern radio show that is broadcast by WXRK at 92.3 MHz from New York, N.Y., and by many other radio stations. As yet another example, the set of recordable events data 200 may include data for the type of recordable events that are delivered via the Internet or via another wired and/or wireless network. In this regard, delivery via the Internet may occur by downloading or streaming a recordable event to a device that records the recordable event. As still yet another example, the set of recordable events data 200 may include data for more than one type of recordable events, such as television shows and radio shows. Other examples of types of recordable events are also possible.

A set of recordable events data includes one or more sets of recordable events. A set of recordable events are all recordable events contained in the set of recordable events data and which have the same show title (or some other identifier for classifying recordable events as a set of recordable events). The set of recordable events data 200 is shown to have two sets of recordable events, namely, a first set of recordable events 202, and a second set of recordable events 204. Alternatively, the set of recordable events data 200 may include more or fewer sets of recordable events than two sets of recordable events.

The first set of recordable events 202 includes all episodes of the television show entitled Friends that (i) are identified in the set of recordable events data 200, and (ii) are recordable events during the given period of time for the set of recordable events data 200. The second set of recordable events 204 includes all episodes of the television show entitled Sponge Bob Square Pants that (i) are identified in the set of recordable events data 200, and (ii) are recordable events during the given period of time for the set of recordable events data 200.

A given set of recordable events, such as the first set of recordable events 202, may be analyzed so as to identify a relationship between one or more episodes of the given set of recordable events. The one or more episodes linked by a relationship are a series of recordable events. A series of recordable events is a subset of a set of recordable events and may include all recordable events of the set of recordable events.

The relationship that links one or more episodes of recordable events within a set of recordable events may have one or more relationship descriptors. Examples of relationship descriptors include a channel/frequency number, a time-slot, and a day(s)-of-the-week schedule. Other examples of relationship descriptors are also possible.

By way of example, the first set of recordable events 202 includes three subsets of recordable events for the television show Friends, namely, (i) a first subset 206 that is recordable every Monday from 7:30 pm to 8:00 pm on channel 2, (ii) a second subset 208 that is recordable every Friday from 1:00 am to 1:30 am on channel 4, and (iii) a third subset 210 that is recordable every Wednesday from 8:30 pm to 9:00 pm on channel 4.

By way of another example, the second set of recordable events 204 includes two subsets of recordable events for the television show Sponge Bob Square Pants, namely, (i) a fourth subset 212 that is recordable every weekday from 3:00 pm to 3:30 pm on channel 5, and (ii) a fifth subset 214 that is recordable every Saturday from 7:00 am to 7:30 am on channel 5.

The first subset 206, the second subset 208, the third subset 210, the fourth subset 212 and the fifth subset 214 are each a respective series of programmable events, and may include more than a single recordable event. For example, if the recordable events data 200 includes data for 14 days, then based on the first subset 206, 2 episodes of the television show Friends are available for recording on Mondays from 7:30-8:00 pm on channel 2, during the 14 day period. Other examples of the subsets within the first set of recordable events 202 or the second set of recordable events 204 are also possible.

After analyzing the set of recordable events data 200 to determine each set of recordable events data 202, 204 and each subset of recordable events data 206, 208, 210, 212, 214, identifiers for each set of recordable events and identifiers for each subset of recordable events may be produced for display on a graphical user interface (GUI) so as to indicate the series of recordable events that may be scheduled for recordation.

Scheduling to record a series of recordable events may include scheduling to record recordable events beyond the given period of time covered by the recordable events data 200. Thus, for example, although the given time period of the recordable events data 200 may be 14 days, scheduling to record the first subset 206 may result in recording 4 episodes of Friends over a 4 week period, 5 episodes of Friends over a 5 week period, etc. In this regard, a series of recordable events may be considered to include more recordable events than just those recordable events described within the recordable events data 200.

2. Exemplary Architecture

Figure 3:
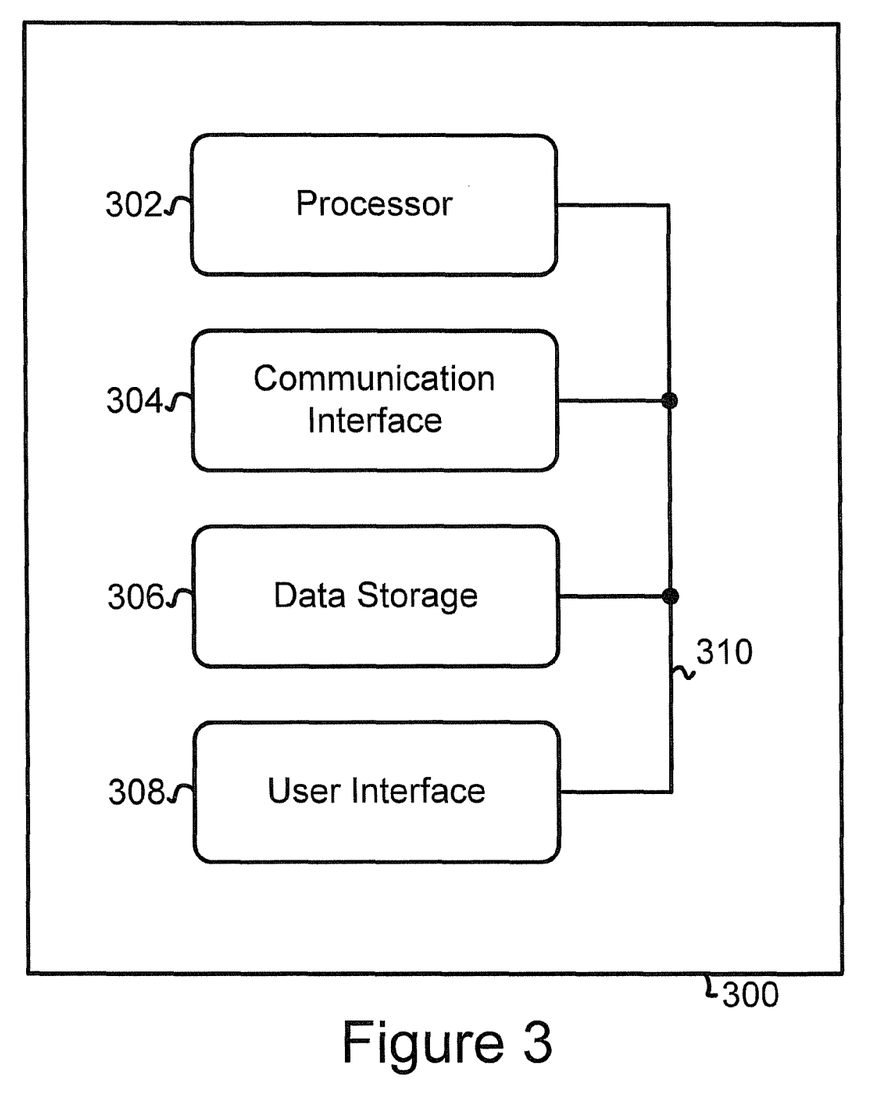
FIG. 3 is a block diagram illustrating an exemplary embodiment of a system for carrying out the present invention.

The block diagram of FIG. 3 depicts a system for use in displaying identifiers for one or more series of recordable events. As shown in FIG. 3, the system 300 includes (i) a processor 302, (ii) a communication interface 304, (iii) data storage 306, and (iv) a user interface 308, all linked together via a system bus, network, or other connection mechanism 310.

The processor 302 may include one or more processors, such as a general purpose processor and/or a digital signal processor. The processor 302 executes program instructions that are stored at the data storage 306, and responsively functions to interact with the communication interface 304 and the user interface 308, to facilitate performance of the functions described herein.

The communication interface 304 facilitates the transmission of data from the system 300 as well as the reception of data into the system 300. Examples of data that the communication interface 304 may receive include a set of recordable events data, and recordable events, such as television shows or radio shows. Recordable events may be received according to a schedule identified in the set of recordable events data or at a requested time, such as an on-demand pay-per-view movie that can start at a time specified by the user. Examples of data that the communication interface 304 may transmit include a request to update a set of recordable events data, and a request to receive a recordable event. Other examples of data that the communication interface 304 may receive or data that the communication interface 304 may transmit are also possible.

The communication interface 304 may be arranged in various configurations to transmit and/or receive data. For example, the communication interface 304 may be arranged as a wireless interface that receives data encoded within radio-frequency signals broadcast by a terrestrial antenna and/or a satellite circumnavigating the Earth. As another example, the communication interface 304 may be arranged as a wired interface that receives data encoded within signals transmitted via a traditional copper telephone land-line, or a coaxial cable, such as a cable for routing cable television signals, or a data network cable, such as a category 5 cable or an optical cable. The communication interface 304 may interface to a private network, such as a local area network, or a public-access network, such as the Internet. Other examples of the arrangements for the communication interface 304 are also possible.

The communication interface 304 may include means for converting a received recordable event into a format that may be stored in data storage 306. Alternatively, the system 300 may include other means for converting a received recordable event into a format for storage in data storage 306. In this regard, the means may perform signal conditioning, signal conversion (such as conversion from an analog signal to a digital signal), and/or signal filtering, so as to convert a recordable event into a format that may be stored in the data storage 306.

The data storage 306 may include a computer readable and writeable medium, such as a magnetic disc, an optical disc, organic memory, and/or any other volatile and/or non-volatile mass storage system readable and writable by the processor 302. Alternatively, the data storage 306 includes a combination of one or more segments of computer readable and writable media. In this regard, for example, data storage 306 may include a first segment of computer readable and writable media located in the processor 302 and a second segment of computer readable and writable media remote from the processor 302. As an example, the second segment of computer readable and writable media may be arranged as (i) a portable hard-drive data storage unit, or (ii) an integral hard-drive storage unit, or (iii) a magnetic tape, such as a VHS-format video tape. Other examples of data storage 306 or segments of the data storage 306 are also possible.

The data storage 306 may store various types of data. For example, the data storage 306 may store program instructions executable by the processor 302 in non-volatile data storage. In particular, the program instructions may include instructions that are executable to analyze a set of recordable events data (e.g. all television shows to be broadcast by a local cable television supplier) for determining one or more sets of recordable events (e.g. first set of recordable events 202, and the second set of recordable events 204).

Further, in particular, the program instructions may include instructions that are executable to analyze each set of recordable events for determining a respective relationship among one or more subsets of recordable events of each set of recordable events. In this regard, the respective relationship may be defined by one or more relationship descriptors that are included in the set of recordable events data.

Further still, the program instructions may include instructions that are executable to determine a plurality of sub-relationships for splitting a given series into one or more sub-series of recordable events. By way of example, a relationship descriptor for a series may indicate that a television show is to be shown on channel 2 at 8:00 pm to 9:00 pm every Tuesday and Wednesday. In this regard, the program instructions may be executed to determine line a first sub-relationship for the shows to be shown on channel 2 at 8:00 pm to 9:00 pm every Tuesday, and a second sub-relationship for the shows to be shown on channel 2 at 8:00 pm to 9:00 pm every Wednesday. After splitting the series, a first indicator of a first sub-series for television shows having the first sub-relationship and a second indicator of a second sub-series for television shows having the second sub-relationship may be produced and stored in data storage 306. Thereafter, a GUI may display the first indicator of the first sub-series and the second indicator of the second sub-series to inform a user of each sub-series that may be scheduled for recordation.

As another example, the data storage 306 may store a recordable event, a set of recordable events data, a set of recordable events, and a subset of recordable events in non-volatile data storage and/or volatile data storage. The data storage 306 may store identifiers for use in displaying on a GUI display or other type of display. Further, the data storage 306 may store a schedule of the recordable events that are to be recorded based on the recordable events selected by a user. Other examples of the types of data that may be stored in the data storage 306 are also possible.

The user interface 308 provides means for a user to communicate data into the system. As an example, the means for a user to communicate data into the system may include (i) a wireless remote control receiver for receiving wireless communication from a remote control, and/or (ii) a keypad or touch-screen for receiving data input by a user pressing keys correlated with certain data and or functions, and/or (iii) a speech recognition system for receiving data and or commands spoken by a user. Other examples of the means for a user communicating data into the system are also possible.

Various types of data (and/or commands) may be communicated into the system 300 by a user. As an example, communicating data may include communicating a selection of a recordable event to be recorded. As another example, communicating data may include communicating a request that a recordable event be transmitted to the system at a given time (e.g. a pay-per-view movie). Other examples of the types of data that may be communicated into the system 300 are also possible.

The user interface 308 also provides means for communicating data to a user of the system 300. In this regard, the data communicated to the user may be data that is (i) visual on a display, such as a touch screen, a liquid crystal display, a cathode ray tube, or a plasma screen, or (ii) audible via a speaker. Other examples of the user interface 308 providing means for communicating data to the user of the system 300 are also possible.

Various types of data may be communicated to a user from the system 300. For example, the user interface 308 may display identifiers that indicate a series of recordable events that are to be broadcast at certain times over a given period of time and that may be scheduled for recordation. As another example, the user interface 308 may include a GUI that displays a variety of images that indicate functions that may be performed in response to selecting a function indicator via the GUI. FIGS. 4-10 depict examples of a GUI arranged according to the exemplary embodiment for communicating data from the system 300 to a user of the system 300, as well as to provide means for communicating data into the system 300.

Figure 4:
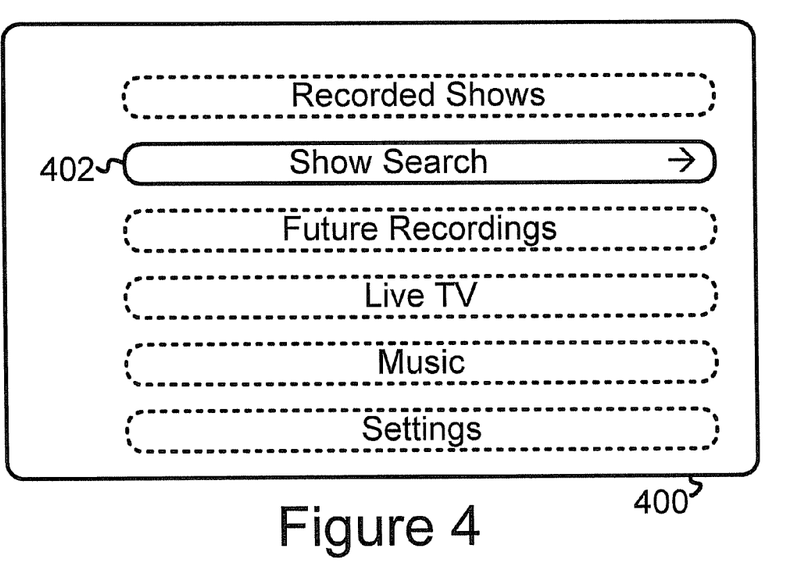
FIG. 4 depicts an example of a main menu of a graphical interface unit (GUI)

FIG. 4 depicts an example of a GUI main menu 400. The main menu 400 allows a user to enter sub-menus for menu items listed in the main menu 400. Examples of menu items that may be listed in a main menu include "Recorded Shows", "Show Search", "Future Recordings", "Live TV", "Music" and "Settings", as shown in FIG. 4. Other examples of menu items that may be listed in a main menu include "Live Radio", and "Internet Transmissions." Other examples of menu items listed in a main menu are also possible.

Selecting a main menu item to access sub-menus may occur in a variety of ways. As an example, a highlighted bar 402 may be used to select a menu item in the main menu, and in turn, to indicate that sub-menus are available and how to access the sub-menus. Accessing the sub-menu may require the user to press a keypad key, such as an "up key", a "down key", a "left key", or a "right key", or to take some other action. Further, the highlighted bar 402 could be relocated to highlight another of the menu items shown on the GUI main menu 400. For example, the highlighted bar 402 could be relocated to highlight the "Future Recordings" menu item so as to provide access to the sub-menu items associated with the "Future Recordings" menu item.

Figure 5:
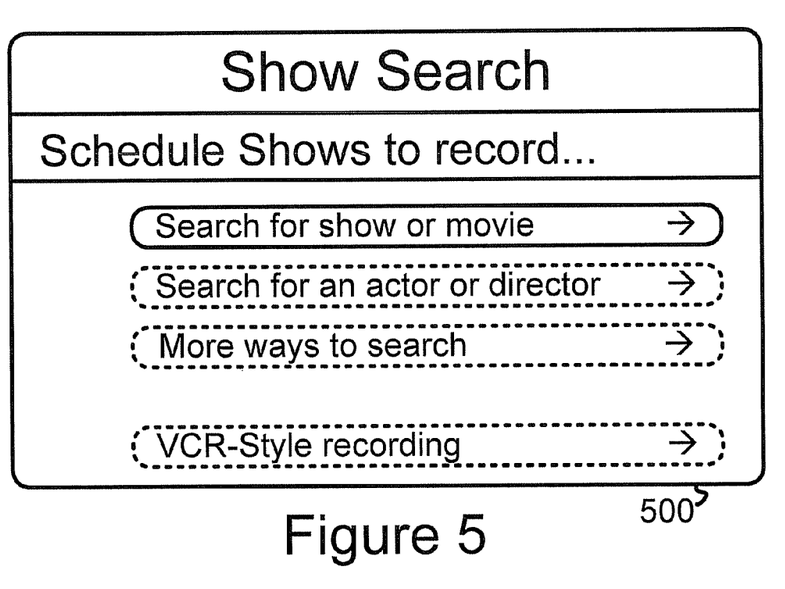
FIG. 5 depicts an example of a GUI sub-menu that allows for selecting a method for performing a show search.

FIG. 5 shows a sub-menu of the main menu shown in FIG. 4. In particular, FIG. 5 shows a sub-menu that indicates methods for performing a show search for shows that are to be recorded. In this regard, the show search may involve performing a search by the title of a show or movie, or by the name of an actor or director of the show, or by some more ways to search that are disclosed by changing to a sub-menu of the sub-menu item "More Ways to Search" shown in FIG. 5.

The sub-menu of FIG. 5 also includes an additional sub-menu item described as "VCR-Style recording." This additional sub-menu item is offset from the top three sub-menu items by a large blank space. By using a large blank space, placing certain menu items at the bottom of a menu, and by designing entry into the sub-menu to occur at the top of the sub-menu, a designer of a sub-menu (or menu) can steer which sub-menu items are more likely to be used by a user.

Figure 6:
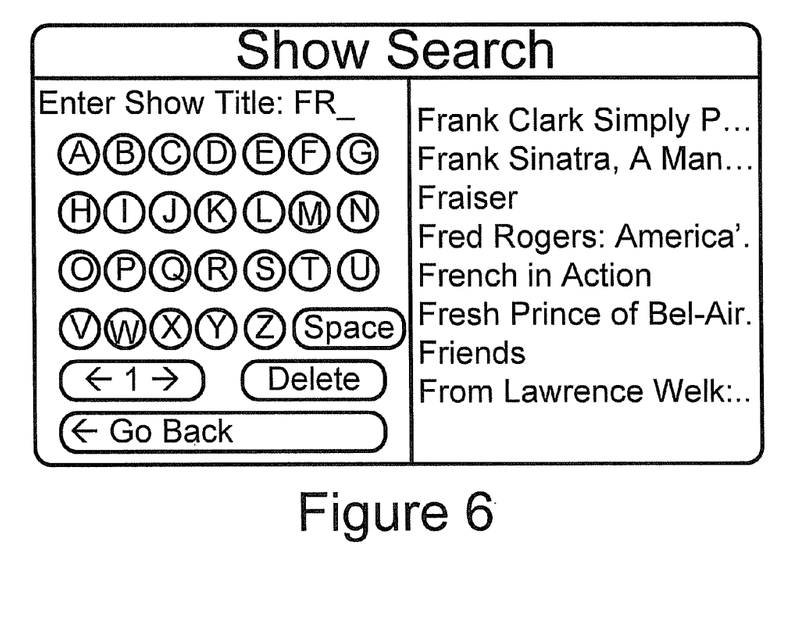
FIG. 6 depicts a GUI keypad for performing a show search by entering a show title.
Figure 10:
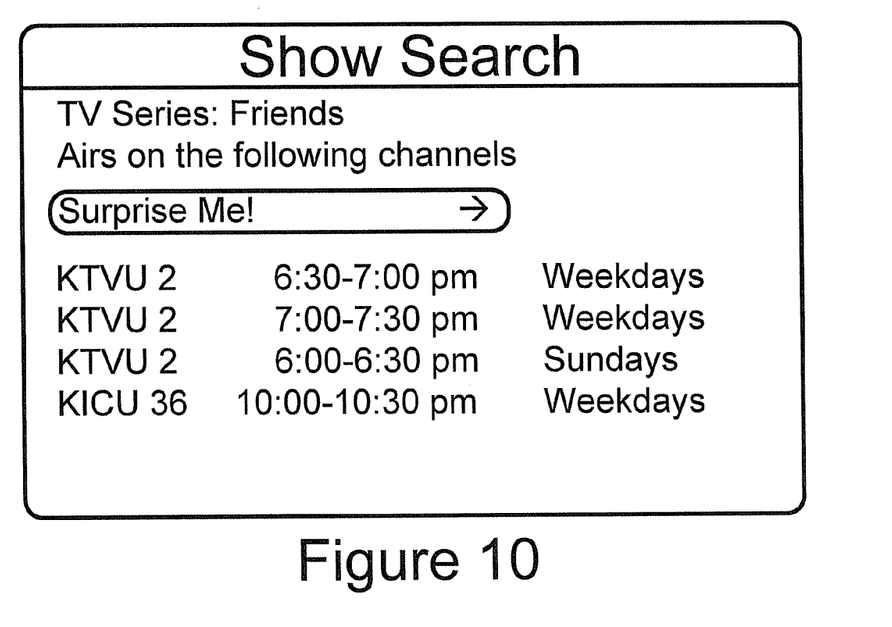
FIG. 10 depicts a GUI displaying the results of a show search.

By selecting the "Search for show or movie," search function shown in the sub-menu of FIG. 5, the sub-menu shown in FIG. 6 appears on the GUI. As shown in FIG. 6, a graphical keypad allows for the entry of letters of a show title. Prior to entering any letters of a show title, all shows that are identified by a set of recordable events data are available for display on the right-hand side of the GUI. After a first letter is entered, for example, the letter "F", only the titles of shows that are identified by the set of recordable events data and that start with the letter "F" are available for display on the GUI. After a second letter is entered, for example, the letter "R", only titles of shows that are identified by the set of recordable events data and that have the letters "FR" as their first and second letters are available for display on the GUI. Other shows, in addition to the shows shown in FIG. 6, may have "FR" as the first two letters of their title but are not shown because the exemplary GUI only allows for displaying 8 lines of show titles. If the letter "I" is entered after entering the letters "FR", the letters "FRI" will be displayed on the graphical keypad display. Since the show entitled Friends is the only show that matches the show title search criteria of "FRI", the GUI may only show the show entitled Friends on the right-hand side of the GUI, or could automatically change to another sub-menu that displays all of the series of the show entitled Friends that may be recorded. FIG. 10 shows an example of search results that include a list of series of the show entitled Friends.

Figure 7:
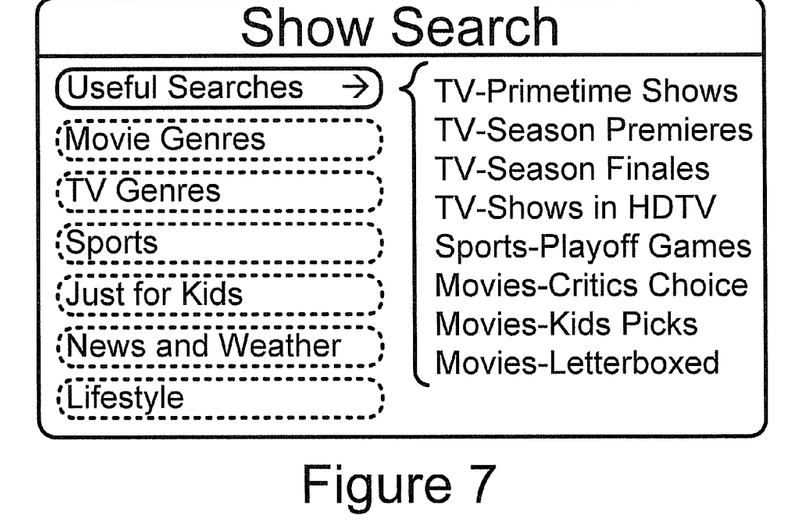
FIG. 7 depicts a GUI that displays a show search screen using seven major categories.

FIG. 7 depicts a display of a GUI that facilitates the performance of a show search for selecting a series of shows to be recorded. In FIG. 7, the left-hand side of the GUI lists seven major categories of recordable events. A different number of major categories of recordable events may also be used. The different number of major categories may be based on the size of the GUI and the size of the font used to display the different number of major categories.

The right-hand side of the GUI shown in FIG. 7 is an area of the GUI for displaying respective sub-categories for each of the seven major categories when one of the seven major categories is selected. As shown, in FIG. 7, a first major category named "Useful Searches" is selected and 8 sub-categories are displayed on the right-hand side of the GUI. A different number of sub-categories for the first major category may also be used. The other six major categories may have a number of subcategories that is more than, less than, or equal to 8 sub-categories.

Figure 8:
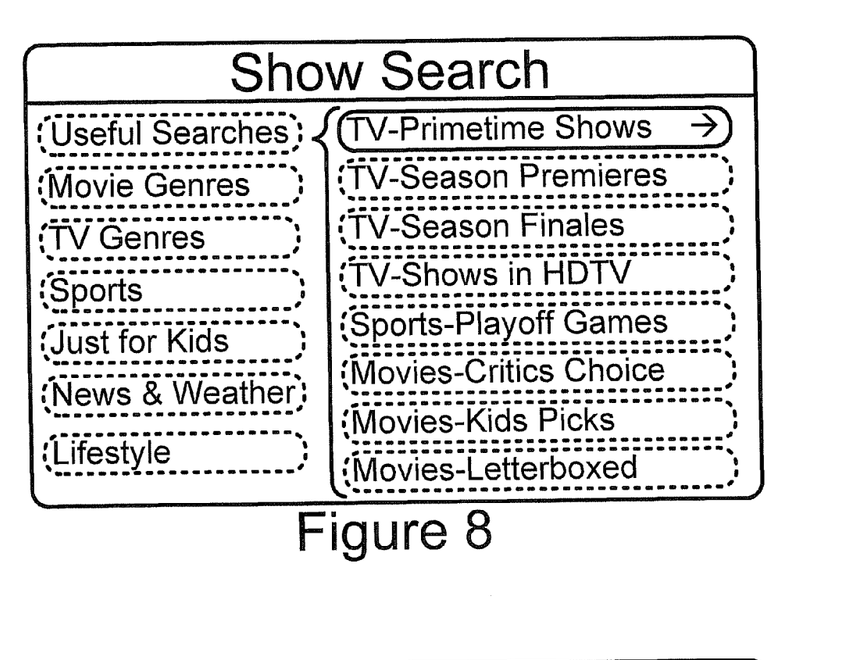
FIG. 8 depicts a GUI displaying a show search screen that uses seven major categories, and a first of the seven major categories (Useful Searches) selected and a sub-category (TV-Primetime Shows) selected.

In FIG. 8, a first sub-category named "TV-Primetime Shows" of the first major category named Useful Searches, is selected. In this regard, the first sub-category is highlighted as compared to the remaining 7 sub-categories displayed on the right hand side of the GUI. The first sub-category (when highlighted) includes an arrow that indicates that more information (or more options) pertaining to the first sub-category is available.

Figure 9:
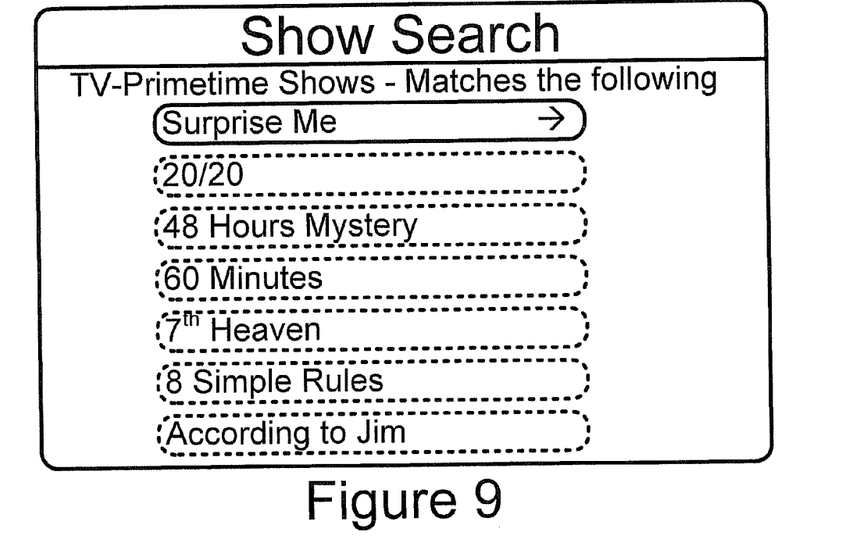
FIG. 9 depicts a GUI displaying a show search result for TV-Primetime Shows.

In FIG. 9, a display of a GUI shows the results of selecting the first sub-category (TV-Primetime shows) of the first major category (Useful Searches). In this regard, the GUI displays a "Surprise Me!" option, and a list of primetime shows in alphabetical order, where show titles starting with numbers (e.g. 20/20, 48 Hours Mystery, and 60 Minutes) are at the beginning of the list, followed by show titles starting with letters. Other primetime shows may be displayed on the GUI by (i) entering letters of a show title, (ii) using a scroll up feature, (iii) using a scroll down feature, (iv) using a page up feature, or (v) using a page down feature. Other examples for how to display other primetime shows on the GUI are also possible.

The Surprise Me feature provides a means for a user of the system 300 to schedule shows to be recorded based on a predetermined search criteria and a set of rules based on the predetermined search criteria. The Surprise Me feature allows for recording of shows based on the predetermined search criteria and the set of rules so long as no other shows are scheduled to be recorded. The Surprise Me feature may include a time limit, such as 4 hours, so that only 4 hours of shows based on the predetermined search criteria and the set of rules are recorded. In FIG. 10, a list of series for the show entitled Friends is displayed as a result of a show search for the television show Friends. The list of series identifies four different series for the show entitled Friends. An identifier of a first series is the identifier that indicates the television show Friends is to be broadcast on Weekdays, from 6:30 pm to 7:00 pm on KTVU Channel 2. An identifier of a second series is the identifier that indicates the television show Friends is to be broadcast on Weekdays, from 7:00 pm to 7:30 pm on KTVU Channel 2. An identifier of a third series is the identifier that indicates the television show Friends is to be broadcast on Sundays, from 6:00 pm to 6:30 pm on KTVU Channel 2. An identifier of a fourth series is the identifier that indicates the television show Friends is to be broadcast on Weekdays, from 10:00 pm to 10:30 pm on KICU Channel 36. Any of the identifiers for the first series, second series, third series, and fourth series, may be selected via the GUI so as to schedule the selected series for recordation.

Figure 11:
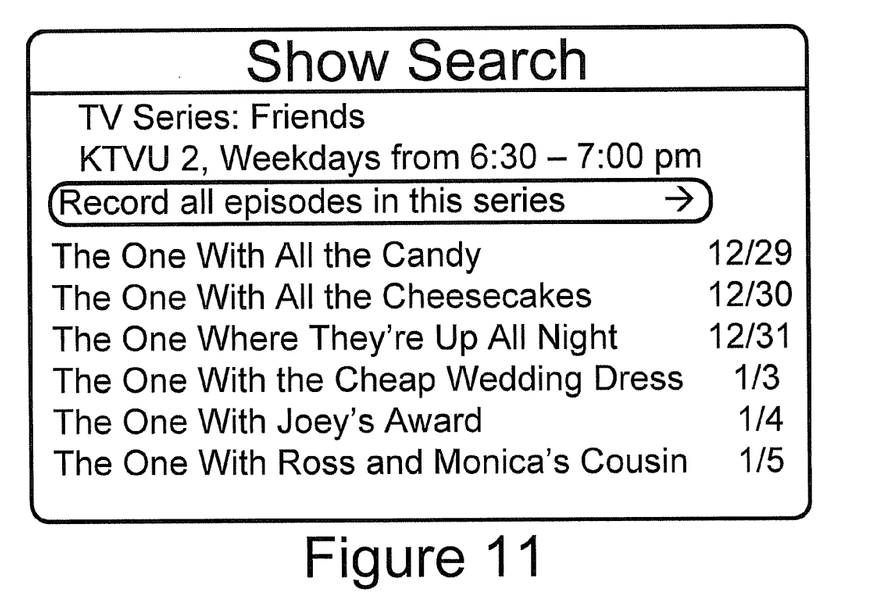
FIG. 11 depicts a GUI displaying detailed results of a show search.

In FIG. 11, the GUI displays a more detailed list of a first series for the show entitled Friends that is broadcast weekdays from 6:30 pm to 7:00 pm on KTVC Channel 2. The GUI also provides an option to schedule the recordation of all episodes in the first series. In FIG. 11, the GUI displays a synopsis for each episode in the first series. A user may use the displayed synopsis in making a determination whether to record all, some, or none of the episodes of the first series. The user may use the displayed synopsis for other reasons as well.

The system 300 may be arranged in other configurations as well. For example, the system 300 may be arranged as described in U.S. patent application Ser. No. 11/030,422, which is entitled Method and System for Reconfiguring a Selection System Based on Layers of Categories Descriptive of Recordable Events, which issued as U.S. Pat. No. 7,290,211, and which is hereby incorporated by reference.

3. Exemplary Operation

According to the exemplary embodiment, the system 300 receives a set of recordable events data for use in determining one or more sets of recordable events, and in turn, for use in determining a respective relationship among one or more subsets of recordable events. After determination of the one or more subsets of recordable events, an identifier for each of the one or more subsets of recordable events for a given set of recordable events may be displayed on a GUI. The GUI provides a means for selecting a subset of recordable events so as to schedule a recording means to record the recordable events that make up the subset of recordable events. The recording means may be a digital video recorder.

Figure 12:
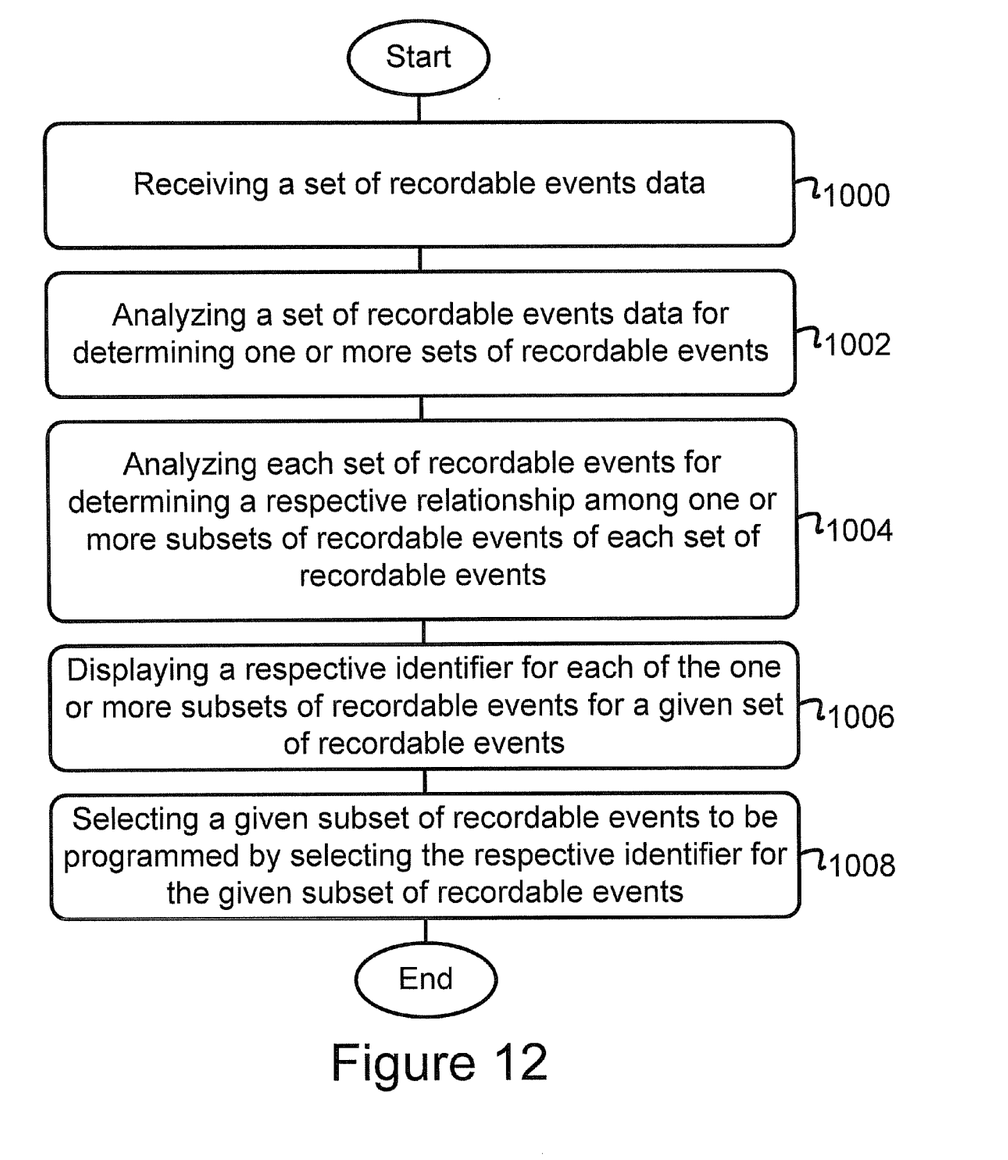
FIG. 12 is a flow chart depicting functions that can be carried out in accordance with an exemplary embodiment of the present invention.

FIG. 12 is a flow chart provided to illustrate some of these functions. As shown in FIG. 12, at block 1000, a set of recordable events data is received. As an example, the communication interface 304 shown in FIG. 3 is arranged to receive a set of recordable events data. Other examples of a device or system that is arranged to receive a set of recordable events data are also possible.

Receiving the set of recordable events data may be carried out using any of a variety of methods. For example, receiving the set of recordable events data may occur via a wireless or wired communication interface. As another example, receiving the set of recordable events data may be in response to a request for the set of recordable events data, or performed automatically at a designated time. In this regard, receiving the set of recordable events data may occur at a time, such as 1:00 AM Eastern Standard Time, when there is a lesser amount of communications occurring via a network that interfaces with the communication interface. Other examples of methods available for receiving the set of recordable events are also possible. After receiving the set of recordable events data, the set of recordable events data may be stored in data storage of the system/device that receives the set of recordable events data.

At block 1002, a set of recordable events data is analyzed for determining one or more sets of recordable events. A processor may execute program instructions to carry out this analysis. The program instructions may determine the one or more sets of recordable events based on a title of a recordable event. For example, determining a set of recordable events for all shows entitled Friends. As another example, the one or more sets of recordable events could also be determined by searching some other criteria, such as by an actor's name, or a director's name. Other examples of criteria used to determine one or sets of recordable events are also possible.

At block 1004, each set of recordable events is analyzed for determining a respective relationship among one or more subsets of recordable events of each set of recordable events. A processor may execute program instructions to carry out this analysis.

Determining the respective relationship may occur in various ways. For example, a set of recordable events may be analyzed to determine a first relationship descriptor, such as channel number, for each recordable event. In this regard, a series for each channel number that will broadcast one of the recordable events is created.

In turn, each of these series may be analyzed to determine a second relationship descriptor, such as a time-slot, for each recordable event. In this regard, a series for each channel number and each time-slot when one of the recordable events will be broadcast is created.

The analysis may continue for additional relationship descriptors, such as a day(s)-of-the-week relationship descriptor, to create even more series based on the first two relationship descriptors and any additional relationship descriptors. Other examples of analyzing a set of recordable events to determine a respective relationship are also possible.

Ideally, the determination of the respective relationships among one or more subsets of recordable events of each set of recordable events will occur prior to selection of a set of recordable events. In this way, the user will experience minimal delay from the time the set of recordable events is selected till the time the identifier for a series of recordable events is displayed on a GUI. Alternatively, the determination of the respective relationships among one or more subsets of recordable events of each set of recordable events could occur at the time the set of recordable events is selected, as to reduce the size requirements for data storage.

At block 1006, a respective identifier for each of the one or more subsets of recordable events for a given set of recordable events is displayed. Each of the respective identifiers may be displayed after a set of recordable events that includes the one or more subsets of recordable events is selected from a GUI. As shown in FIG. 10, the identifiers may include the call letters for a network (e.g. KTVU), a channel number (e.g. channel 2), a time-slot, and a day(s)-of-the-week descriptor. Other examples of identifiers for indicating one or more relationship descriptors of a series of recordable events are also possible.

At block 1008, selection of a given subset (series) of recordable events to be recorded is made by selecting the respective identifier for the given subset of recordable events. Making the selection may involve using a keypad (or other means) to move a highlighted bar to the position of the respective identifier, and in turn using another key of the keypad to make a selection that the given subset of recordable events is to be recorded. The GUI that displays a respective identifier for multiple series of recordable events may also allow for selecting more than one, including all, of the series of recordable events by use of a keypad to (i) highlight and select more than one identifier, or (ii) select all identifiers with the press of a single key. Other examples for selecting a given series of recordable events to be recorded are also possible.

4. Conclusion

An exemplary embodiment of the present invention has been described above. Those skilled in the art will understand, however, that changes and modifications may be made to the embodiment described without departing from the true scope and spirit of the present invention, which is defined by the claims.

We claim:

1. A method carried out at a recordable event recorder including a processor, a user interface, and a data storage device, the method comprising:
 maintaining, at the data storage device, a set of recordable events data that identifies multiple recordable events recordable by the data storage device, wherein the multiple recordable events comprise a first group of recordable events associated with a common title;
 receiving, by the user interface, a selection of the common title and responsively executing, by the processor, computer-readable program instructions to identify from the first group of recordable events a first plurality of recordable event series, wherein each recordable event series of the first plurality of recordable event series comprises two or more recordable events having the common title; and
 executing, by the processor, computer-readable program instructions to communicate, to a graphical user interface, identifiers, displayable by the graphical user interface, of each recordable event series of the first plurality of recordable event series comprising two or more recordable events having the common title.

2. The method of claim 1, wherein the common title comprises a television show title.

3. The method of claim 1, wherein the identifiers of each recordable event series of the first plurality of recordable event series includes the common title, a time of day identifier, a channel identifier, and a day or days of week identifier.

4. The method of claim 3, wherein the identifiers of at least one recordable event series of the first plurality of recordable event series includes a days of week identifier that identifies the recordable events of the at least one recordable event series occur on weekdays.

5. The method of claim 1, wherein executing the computer-readable program instructions to communicate the identifiers to the graphical user interface occurs prior to receiving, by the user interface, data that identifies a recordable event series of the first plurality of recordable event series has been selected for recordation by the data storage device.

6. The method of claim 5, further comprising:
 receiving, by the user interface, a selection of a recordable event series from the first plurality of recordable event series; and
 executing, by the processor, computer-readable program instructions to facilitate the graphical user interface displaying a synopsis of a plurality of recordable events of the recordable event series selected from the first plurality of recordable event series.

7. The method of claim 1, further comprising:
 receiving, by the user interface, data that identifies a recordable event series selected for recordation, wherein the first plurality of recordable event series comprises the recordable event series selected for recordation.

8. The method of claim 7, further comprising:
recording, by the data storage device, recordable events of the recordable event series selected for recordation,
wherein the recordable events data pertains to recordable events recordable during a given period of time, and
wherein recording the recordable events of the recordable event series selected for recordation comprises recording (i) during the given period of time, at least one recordable event associated with the common title, and (ii) during a period of time occurring after the given period of time, at least one recordable event associated with the common title.

9. The method of claim 1, wherein the multiple recordable events comprise a second group of recordable events associated with a second common title,
the method further comprising:
receiving, by the user interface, a selection of the second common title and responsively executing, by the processor, computer-readable program instructions to identify from the second group of recordable events a second plurality of recordable event series, wherein each recordable event series of the second plurality of recordable event series comprises two or more recordable events having the second common title;
executing, by the processor, computer-readable program instructions to communicate, to the graphical user interface, identifiers displayable by the graphical user interface, of each recordable event series of the second plurality of recordable event series comprising two or more recordable events.

10. A system comprising:
a data storage device containing computer-readable program instructions and a set of recordable events data that, identifies multiple recordable events recordable at the data storage device, wherein the multiple recordable events comprise a first group of recordable events associated with a common title;
a user interface operable to receive a selection of the common title; and
a processor operable to execute the computer-readable program instructions,
wherein the program instructions are executable by the processor to identify from the first group of recordable events a first plurality of recordable event series, wherein each recordable event series of the first plurality of recordable event series comprises two or more recordable events having the common title,
wherein the program instructions are executable by the processor to communicate to a graphical user interface, identifiers, displayable by the graphical user interface, of each recordable event series of the first plurality of recordable event series comprising two or more recordable events having the common title.

11. The system of claim 10,
wherein the user interface is operable to receive data that identifies a recordable event series selected for recordation, and
wherein the first plurality of recordable event series comprises the recordable event series selected for recordation.

12. The system of claim 11, wherein the data storage device is operable to record at least one recordable event of the recordable event series selected for recordation.

13. The system of claim 11,
wherein the recordable events data pertains to recordable events recordable during a given period of time,
wherein the data storage device is operable to record, during the given period of time, at least one recordable event associated with the common title, and
wherein the data storage device is operable to record, during a period of time occurring after the given period of time, at least one recordable event associated with the common title.

14. A method carried out at a recordable event recorder including a processor, a user interface, and a data storage device, the method comprising:
maintaining, at the data storage device, a set of recordable events data that identifies multiple television shows recordable by the data storage device, wherein the multiple television shows comprise a first group of television shows associated with a common television show title;
receiving, by the user interface, a selection of the common television show title and responsively executing, by the processor, computer-readable program instructions to identify from the first group of television shows a first plurality of television show series, wherein each television show series of the first plurality of television show series comprises two or more television shows having the common television show title; and
executing, by the processor, computer-readable program instructions to communicate data, to a graphical user interface, identifiers, displayable by the graphical user interface, of each television show series of the first plurality of recordable television show series comprising two or more recordable televisions shows having the common television show title.

15. The method of claim 14, further comprising:
receiving, by the user interface, a selection of a television show series from the first plurality of television show series; and
executing, by the processor, computer-readable program instructions to facilitate the graphical user interface displaying a synopsis of a plurality of television shows of the television show series selected from the first plurality of television show series.

16. The method of claim 1,
wherein receiving the selection of the common title includes receiving, by the user interface, a beginning portion of the common title, and
wherein the beginning portion of the common title is less than the entire common title.

17. The method of claim 1, further comprising:
receiving, by the user interface, a selection of a recordable event series from the first plurality of recordable event series; and
executing, by the processor, computer-readable program instruction to facilitate the graphical user interface displaying a synopsis of a plurality of recordable events of the recordable event series selected from the first plurality of recordable event series.

18. The method of claim 1, wherein each recordable event series of the first plurality of recordable event series is associated with a unique combination of time, channel number, and day or days of week.

* * * * *